United States Patent [19]
McCasland

[11] Patent Number: 5,887,346
[45] Date of Patent: Mar. 30, 1999

[54] CO-AXIAL FLEXIBLE PIPE JACKET CUTTER

[75] Inventor: Craig D. McCasland, Devol, Okla.

[73] Assignee: Ameron International Corporation, Pasadena, Calif.

[21] Appl. No.: 899,446

[22] Filed: Jul. 23, 1997

[51] Int. Cl.[6] .................................................. B21F 13/00
[52] U.S. Cl. .............................. 30/90.1; 30/90.4; 30/90.6
[58] Field of Search .................................. 30/90.6, 90.4, 30/90.1, 90.7, 92, 123; 81/9.4

[56] References Cited

U.S. PATENT DOCUMENTS

| | | |
|---|---|---|
| 198,709 | 12/1877 | Thornton . |
| 402,730 | 5/1889 | Foerster . |
| 1,165,176 | 12/1915 | Hornor . |
| 2,235,575 | 3/1941 | Edwards ............................. 30/90.6 X |
| 3,171,199 | 3/1965 | Meese ........................................ 30/94 |
| 4,536,957 | 8/1985 | Britton ..................................... 30/90.4 |
| 5,285,576 | 2/1994 | Taylor ........................................ 30/94 |

FOREIGN PATENT DOCUMENTS 2 133 226   7/1984   United Kingdom ...................... 81/9.4

Primary Examiner—Douglas D. Watts
Attorney, Agent, or Firm—Christie, Parker & Hale, LLP

[57] ABSTRACT

A cutting tool for cutting jacketed pipes and other cylindrical objects comprising a handle attached to a guide and a blade translatably and rotatably secured within the handle. The blade is mounted to a blade mounting assembly. The blade mounting assembly is biased towards the guide by a spring. Extension of the blade in the direction of the guide is limited by an engagement arm of the blade mounting assembly which may be placed in slots radiating in different directions in the free end of the handle. Thus, the blade may be securely positioned at differing amounts of extension and at differing angles with respect to the handle.

14 Claims, 4 Drawing Sheets

5,887,346

CO-AXIAL FLEXIBLE PIPE JACKET CUTTER

FIELD OF THE INVENTION

This invention pertains to cutting tools. This invention particularly pertains to cutting tools for pipes surrounded by jacketing material.

BACKGROUND OF THE INVENTION

Pipes, electrical wires, and the like often comprise an inner core covered by jacketing or insulating material. In the case of pipes it may be desirable to jacket the pipe with such material so as to insulate the pipe, to protect the pipe from damage from external sources, or to provide a secondary containment system for the pipe. Electrical wires, including coaxial cable, require jacketing insulation so as to avoid the possibility of short circuits.

The use of a jacketing material for pipes is of great use in providing a secondary containment system for the materials transported via the pipe, as well as in providing for a means to determine whether a failure or leakage of the primary pipe has occurred. This is accomplished by providing a jacketing material with an inner diameter greater than the outer diameter of the pipe so as to allow fluids which leak from the primary pipe to be contained within the void between the pipe and the jacketing material. Allowing such fluids to drain to a sump, and periodically inspecting the sump for fluid, provides a convenient method of determining if a pipe has failed or is otherwise leaking.

Although referred to as pipe, the conduit may be flexible and be considered a hose.

It is often necessary to couple together sections or links of such pipes, wires, or other jacketed material. To do so generally requires cutting through both the jacketing material and the pipe or wire to provide a mating surface perpendicular to the axis of the pipe or wire, and then to strip or remove portions of the jacketing material near an end so as to expose a portion of the pipe or wire to allow for the coupling of sections of the pipe or wire. In the case of pipes, it is of great importance not to puncture or otherwise damage the pipe when removing the jacketing material so as to avoid pipe failures and leaks. Similarly, it is undesirable to damage wires when removing insulation material from the wires as a loss of conductivity may occur.

One simple tool which may be used to perfume the described operation is a knife. A simple knife, however, provides no means to ensure that the primary pipe or wire is not cut or damaged while removing a portion of the jacketing material. Moreover, the user of the knife may be injured due to the exposed blade of the knife.

Cutting tools in which a cutting blade may be set at various distances via the use of set screws and the like are also known in the art. Such tools, however, require the operator to accurately set the blade location so as to avoid damaging the primary pipe. If the user is unaware of the specific dimensions of the pipe and the jacketing material, such an operation may be difficult. Additionally, the jacketing material may be such that multiple cuts through the jacketing material must be performed. In such a situation, the operator must adjust the position of the cutting blade multiple times.

Additionally, for ease of removal of the jacketing material, it is often desirable to longitudinally cut through the jacketing material in addition to making a circumferential cut. A longitudinal cut allows the jacketing material to be more easily removed. A cutting tool which provides the capability to cut both latitudinally and longitudinally through the use of separate blades set via set screws is known in the art. Such a tool, however, suffers from disadvantages associated with the use of set screws and requires a plurality of blades.

Thus, a cutting tool which allows an operator to safely cut a pipe and easily remove jacketing material from the pipe while not risking damage to the pipe is desirable.

SUMMARY OF THE INVENTION

The present invention provides a cutting tool for safely and easily cutting through pipes and the like and removing jacketing material therefrom. In accordance with the present invention, a cutting tool is provided wherein a blade is mounted to a blade mounting assembly contained in a handle extending laterally from a side of a semicylindrical hollow pipe guide. A spring biases the blade mounting assembly towards the guide. An arm extends from a portion of the blade mounting assembly protruding from the handle, and the arm is selectively fittable into each of a plurality of slots in the end of the handle. Differing depths of the radial slots allow the blade to be extended from the handle predetermined distances and at predetermined orientations.

The present invention thereby provides a tool for safely and easily cutting jacketed materials such as pipes and removing the jackets therefrom to allow for coupling or connecting sections of such pipes. The attendant features of this invention will be more readily appreciated as the same becomes better understood by reference to the following detailed description and considered in connection with the accompanying drawings in which like reference symbols designate like parts throughout.

DETAILED DESCRIPTION OF THE INVENTION

Figure 1:
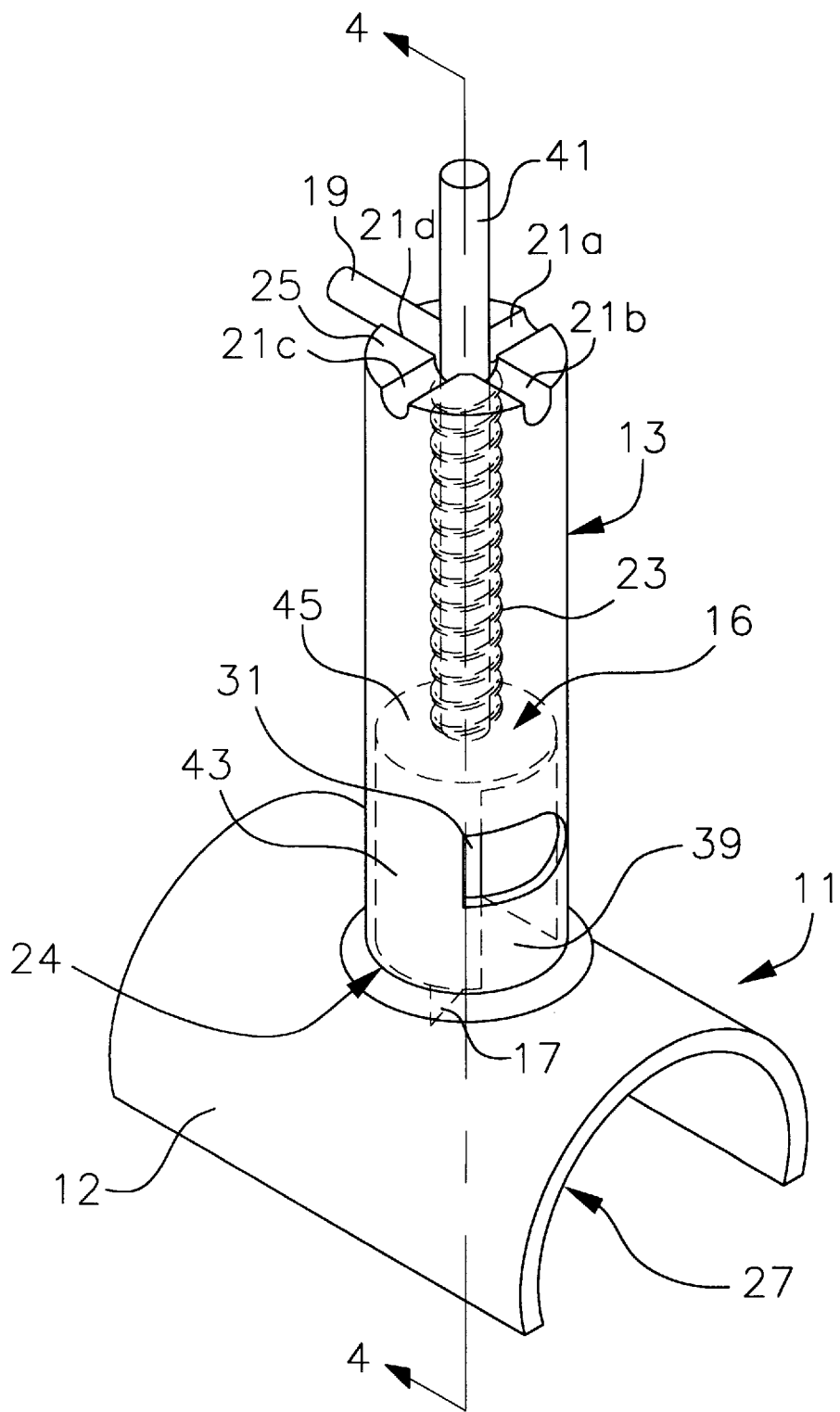
FIG. 1 is a perspective view of an embodiment of the cutting tool of the present invention.

A cutting tool embodying the present invention is shown in FIG. 1. The cutting tool has a handle 13 mounted to a semicylindrical hollow guide 11. The guide has a substantially C-shaped cross-section with an inner surface 27 adapted for engaging pipes and the like. An aperture 39 is formed in the guide approximately midway along the length of the guide. The handle 13 extends laterally from the guide and is mounted over the aperture, the handle and the guide thus together forming a T. The handle has a cavity 37 (shown in FIG. 2) in a blade end 24 of the handle, which is the end of the handle attached to the guide. A bore 38 (shown in FIG. 2), of a smaller diameter than the cavity, extends from the cavity to a free end 25 of the handle, which is the end of the handle opposite the end attached to the guide. A blade mounting assembly 16 is placed within the cavity and the bore. A base 43 of the blade mounting assembly is placed in the cavity. A pin 41 projects from the base and through the bore such that a portion of the pin protrudes from the free end of the handle. A blade 17 is mounted to the base 43 so that the blade extends from the base on a side opposite the pin. An engagement arm 19 laterally extends from the portion of the pin protruding from the free end of the handle. The arm is placed in a slot 21d, which is one of several slots 21a–d formed in the free end of the handle. The slots radiate from the bore.

Figure 2:
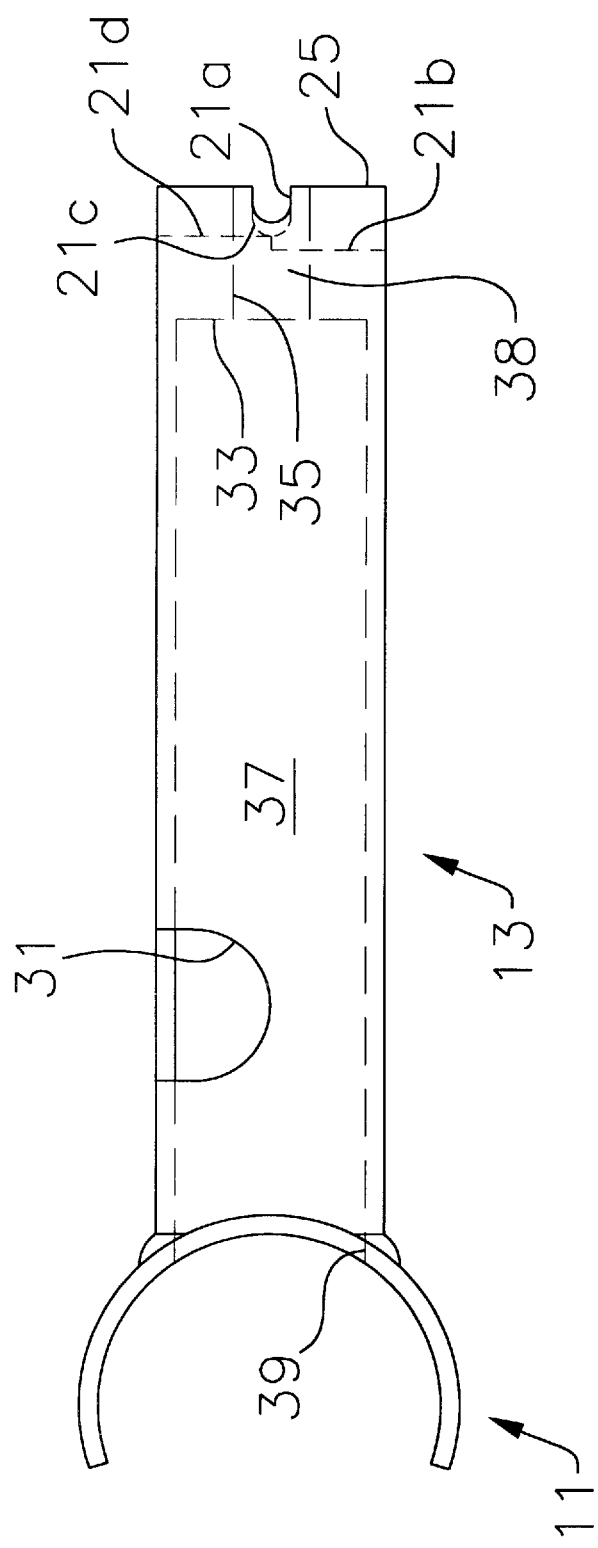
FIG. 2 is a side view of the housing of the cutting tool of FIG. 1.

The handle 13 is shown in FIG. 2 attached to the guide 11. The cavity and the bore together form a passage from the blade end of the handle to the free end of the handle. The change in diameter from the cavity to the bore forms an internal shoulder 33 in the handle.

Figure 3:
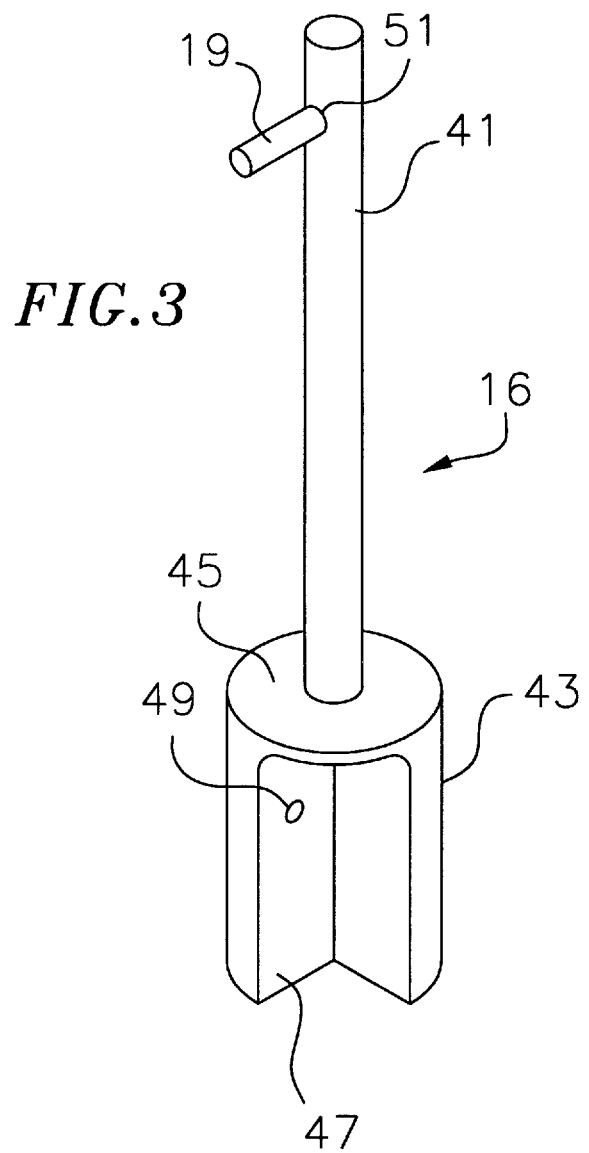
FIG. 3 is a perspective view of the blade holder and transverse pin of the cutting tool of FIG. 1.

The blade mounting assembly is shown in FIG. 3 and is comprised of the base 43 and the pin 41. The base is substantially a right circular cylinder with approximately one-quarter of the cylinder removed. The removed volume provides a flat blade mounting surface 47. The blade mounting surface allows a conventional blade 17 (shown in FIG. 4) with a diagonal cutting surface 49 to be mounted such that the tip of the blade is located along the center axis of the base and the cutting edge of the blade extends axially and radially therefrom. A threaded hole 49 extends into the base from the blade mounting surface. The threaded hole provides a means for securing the blade to the blade mounting surface.

The pin 41 is a cylinder extending coaxial from the base. As the pin is of a smaller diameter than the base, the interface between the pin and the base forms a shoulder 45 on the blade mounting assembly. A hole 51 extends radially through the free end of the pin. The hole is adapted to receive the engagement arm. The engagement arm therefore extends radially from the pin when placed in the hole.

Figure 4:
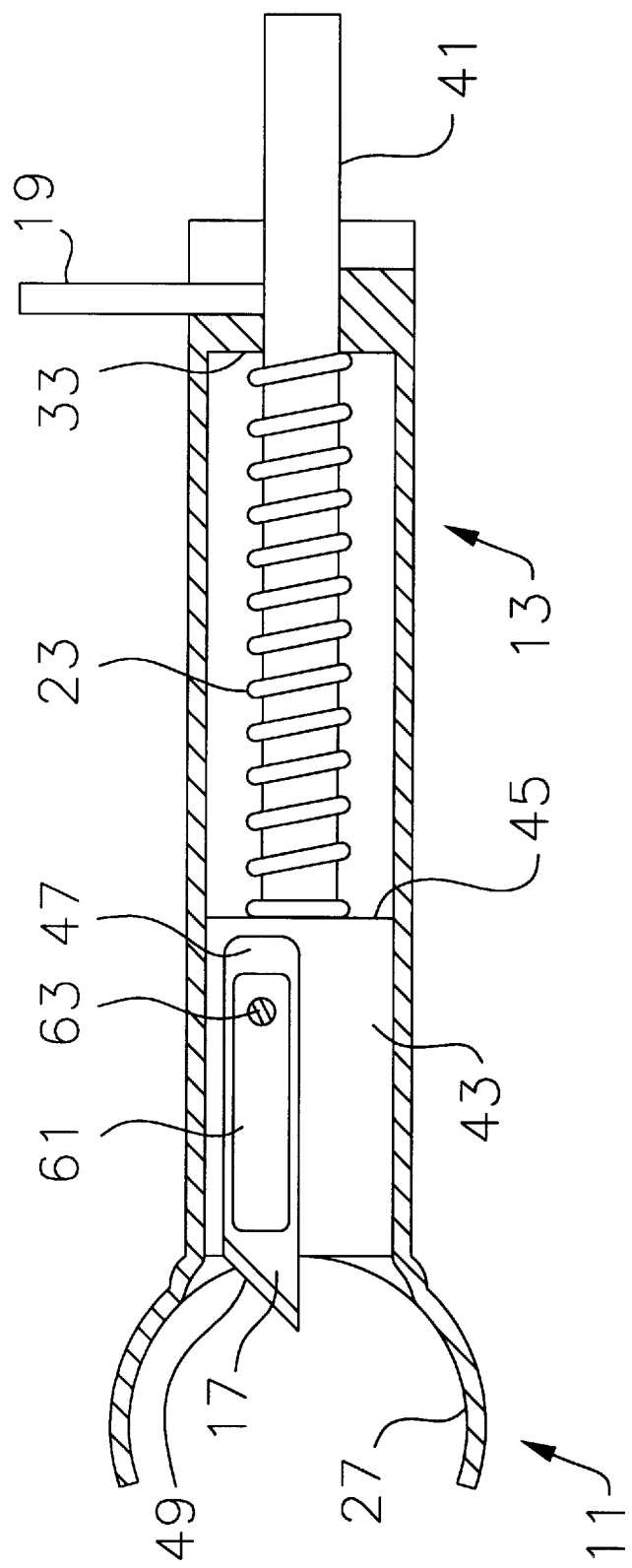
FIG. 4 is a sectional side view of the cutting tool of FIG. 1 taken along the plane 4—4 identified in FIG. 1.

FIG. 4 shows further detail of this embodiment of the invention. The blade mounting assembly is substantially contained within the handle. The blade is secured to the blade mounting surface by a thin rectangular shim 61 attached to the base. The shim is attached to the base by passing a screw 63 through the shim and into the threaded hole. The cavity has an axial depth greater than the axial length of the base of the blade mounting assembly. Therefore, a portion of the pin is within the cavity. A spring 23 is coiled around the portion of the pin within the cavity. The spring abuts both the internal shoulder of the handle and the shoulder on the blade mounting assembly, the shoulders compressing the spring. The compressed spring biases the blade mounting assembly, and therefore the blade, in the direction of the guide. The blade mounting assembly's motion in the direction of the guide is limited by the engagement arm contacting the free end of the handle, specifically the slots in the free end of the handle. The blade extends from the handle different distances and at different angles when the engagement arm is placed in the different slots because the slots adapted to receive the engagement arm are at differing depths and angles.

In practice, therefore, the engagement arm can be placed in a first slot 21a which is of insufficient depth to allow the blade to extend from the handle. The engagement arm is held securely in the first slot as the spring tends to force the mounting assembly towards the guide. Thus, with the engagement arm in the first slot, the blade is safely housed within the handle and cannot accidentally damage material or personnel.

Placing the engagement arm in the second slot 21b permits the blade to circumferentially cut the pipe and its jacketing material. With the engagement arm in the second slot the blade extends from the handle a sufficient distance to cut both a pipe and the pipe's jacketing material. The guide is placed over the pipe and the cutting tool rotated circumferentially around the pipe. Such a cut provides a mating surface for the connection of additional pipe segments.

When the engagement arm is placed in the fourth slot 21d, the blade also extends circumferentially with respect to the guide. The depth of the fourth slot, however, is only sufficient to allow the blade to extend a sufficient distance from the handle to cut the pipe's jacketing material, but not the pipe. Placing the guide over the pipe and circumferentially rotating the cutting tool around the pipe cuts a section of the jacketing material only. The third radial slot is also a depth sufficient to allow the blade to extend a sufficient distance to cut only the pipe's jacketing material. The third slot, however, radiates at 90° to the second and fourth slots. Thus, with the engagement arm in the third slot the blade extends longitudinally with respect to the guide. Placing the guide over the pipe and moving the cutting tool longitudinally along the pipe cuts the jacketing material lengthwise between the mating surface and the circumferential cut in the jacketing material. This lengthwise cut allows the jacketing material to be more easily removed.

Thus, the cutting tool of the present invention provides an easy and safe tool for cutting a pipe and removing jacketing material therefrom. Although this invention has been described in a certain specific embodiment, many additional modifications and variations will be apparent to those skilled in the art. It is therefore to be understood that this invention may be practiced otherwise than is specifically described. For example, modifications could be made to the shape of the blade holder, the handle, or the semicylindrical guide. Thus, the present embodiment of the invention should be considered in all respects as illustrative and not restrictive, the scope of the invention to be indicated by the appended claims rather than the foregoing description.

I claim:

1. A cutting tool comprising:

a generally semicylindrical hollow guide with an inner surface and an outer surface;

a handle extending laterally from the outer surface of the guide, the handle having a blade end mounted to the guide and a free end opposite the blade end; a blade mounting assembly within the handle;

a blade mounted to and extending from the blade mounting assembly, the blade extendable from the blade end of the handle and the blade mounting assembly having an end protruding through an aperture in the free end of the handle;

a plurality of slots in the free end of the handle, the slots extending radially from the aperture; and an arm coupled to the end of the blade mounting assembly protruding from the handle and positionable in the slots, the blade being in a first position relative to the handle and positioned circumferentially with respect to the guide when the arm is positioned in a first of the plurality of slots and in a second position relative to the handle and positioned longitudinally with respect to the guide when the arm is positioned in a second of the plurality of slots.

2. The cutting tool of claim 1 wherein the handle has a cavity in the blade end of the handle and a bore of a lesser diameter than the cavity extending from the cavity to the free end of the handle, the bore forming the aperture in the second side of the handle, and the cavity and the bore forming an internal shoulder in the handle.

3. The cutting tool of claim 2 wherein the blade mounting assembly comprises:

a base adapted for mounting a blade thereon, the blade extending from a first side of the base; and a pin of a lesser diameter than the base extending from a side of the base opposite the side from which the blade extends, the base and the pin forming a shoulder on the blade mounting assembly.

4. The cutting tool of claim 3 further comprising a spring compressed by the shoulder and the internal shoulder, the spring thereby biasing the blade mounting assembly towards the blade end of the handle.

5. The cutting tool of claim 4 wherein the spring is coiled around the pin within the cavity.

6. The cutting tool of claim 5 wherein the cavity and the bore are along a longitudinal axis of the handle and the slots are located ninety degrees apart around the longitudinal axis.

7. The cutting tool of claim 6 wherein the plurality of slots comprises four slots and the blade extends circumferentially relative to the guide and at a relatively shorter distance from the guide when the arm is positioned in the first slot, the blade extends longitudinally relative to the guide and at approximately the relatively shorter distance from the guide when the arm is positioned in the second slot, the blade extends circumferentially relative to the guide and at a relatively longer distance from the guide when the arm is positioned in the third slot, and the blade is retracted within the handle when the arm is positioned in the fourth slot.

8. The cutting tool of claim 7 wherein each of the slots is of a different depth in the free end of the handle then at least one of the other slots.

9. A cutting tool comprising:

a generally semicylindrical hollow guide with an inner surface and an outer surface;

a handle extending laterally from the outer surface of the guide; and a blade mounted in the handle and movable between four preset positions comprising:

a first position with the blade retracted within the handle, a second position with the blade extending circumferentially relative to the guide and at a relatively shorter distance from the inner surface of the guide, a third position with the blade extending circumferentially relative to the guide and at a relatively longer distance from the inner surface of the guide, and a fourth position with the blade extending longitudinally relative to the guide and at approximately the relatively shorter distance from the inner surface of the guide.

10. The cutting tool of claim 9 further comprising: a blade mounting assembly connected to the blade and extending from the end of the handle opposite to the guide; and four detent means located ninety degrees apart around the longitudinal axis of the handle, each detent means corresponding to one of the four positions.

11. The cutting tool of claim 9 further comprising a spring biasing the blade toward the axis of the guide and a detent engagement arm toward the detent means.

12. A cutting tool comprising:

a generally semicylindrical hollow guide;

a handle extending laterally from one side of the guide;

a blade mounting assembly in the handle and having an end protruding from the end of the handle remote from the guide;

a cutting blade mounted on the assembly adjacent to the guide;

a spring biasing the assembly toward the guide;

a plurality of slots on the end of the handle extending radially around the end of the assembly; and a laterally extending arm on the end of the assembly protruding through the end of the handle and selectively fittable into each of the slots for orienting the blade relative to the axis of the guide and for controlling extension of the blade through a wall of the guide.

13. The cutting tool of claim 11 wherein the plurality of slots are orthogonally arranged on the end of the handle.

14. The cutting tool of claim 12 wherein the plurality of slots are of different depths relative to at least one of the other slots.

* * * * *